(12) United States Patent
Schlitzkus et al.

(10) Patent No.: US 9,140,621 B2
(45) Date of Patent: Sep. 22, 2015

(54) ARRANGEMENT FOR THE DIRECT CONTACTING OF CONTACT MECHANISM AND ASSOCIATED CONNECTION UNIT FOR A PRESSURE MEASUREMENT CELL

(71) Applicant: Robert Bosch GmbH, Stuttgart, DE (US)

(72) Inventors: Michael Schlitzkus, Dietmannsried (DE); Hartmut Rohde, Waltenhofen (DE); Stefan Lehenberger, Weitnau (DE); Robert Hengler, Durach (DE); Dmitriy Aranovich, Sonthofen (DE); Christian Pfleger, Reutlingen (DE); Philip Martin Lenk, Burgberg (DE); Peter Diesel, Bad Hindelang (DE)

(73) Assignee: Robert Bosch GmbH, Stuttgart (DE)

( * ) Notice: Subject to any disclaimer, the term of this patent is extended or adjusted under 35 U.S.C. 154(b) by 355 days.

(21) Appl. No.: 13/661,238

(22) Filed: Oct. 26, 2012

(65) Prior Publication Data
US 2013/0104671 A1    May 2, 2013

(30) Foreign Application Priority Data
Oct. 28, 2011   (DE) .......................... 10 2011 085 471

(51) Int. Cl.
*G01L 7/00* (2006.01)
*G01L 19/00* (2006.01)
*G01L 19/14* (2006.01)

(52) U.S. Cl.
CPC ......... *G01L 19/0084* (2013.01); *G01L 19/0007* (2013.01); *G01L 19/147* (2013.01)

(58) Field of Classification Search
CPC ............ G01L 19/0007; G01L 19/0084; G01L 19/147
USPC ................................... 73/756, 715
See application file for complete search history.

(56) References Cited

U.S. PATENT DOCUMENTS

2010/0192696 A1 *   8/2010   Schlitzkus et al. .............. 73/756

FOREIGN PATENT DOCUMENTS

JP          10251860 A   *   9/1998
WO      2009/007286 A2        1/2009

* cited by examiner

*Primary Examiner* — Lisa Caputo
*Assistant Examiner* — Nathaniel T Woodward
(74) *Attorney, Agent, or Firm* — Maginot, Moore & Beck LLP

(57) ABSTRACT

An arrangement for the direct contacting of contact mechanism has a first contact mechanism arranged on a contact carrier and a second contact mechanism. The second contact mechanism acts with a predetermined contact force on the first contact mechanism. The contact carrier includes a plastic injection premolding of galvanizable plastic and a nongalvanizable plastic. The galvanizable plastic has a predetermined resilient behavior and the first contact mechanism is formed by a metal layer having predetermined dimensions. The first contact mechanism can be applied onto the galvanizable plastic in a galvanic process. The resilient behavior of the galvanizable plastic and the dimensions of the metal layer form, under the predetermined contact force, a microdepression configured to guide the second contact mechanism in the first contact mechanism. A corresponding connection device for a pressure measurement cell includes such a direct contacting arrangement.

12 Claims, 3 Drawing Sheets

ARRANGEMENT FOR THE DIRECT CONTACTING OF CONTACT MECHANISM AND ASSOCIATED CONNECTION UNIT FOR A PRESSURE MEASUREMENT CELL

This application claims priority under 35 U.S.C. §119 to patent application no. DE 10 2011 085 471.1, filed on Oct. 28, 2011 in Germany, the disclosure of which is incorporated herein by reference in its entirety.

BACKGROUND

The disclosure is based on an arrangement for the direct contacting of contact means and on an associated connection device for a measurement cell.

WO 2009/007286 A2, for example, discloses a connection unit for a pressure measurement cell. The known connection unit comprises at least one pressure measurement cell, which records in particular a pressure of a hydraulic system, and at least one circuit carrier on which at least one electronic component and/or a circuit board with an electronic component can be arranged. The pressure measurement cell has at least one connection point, via which at least one electrical output signal of the pressure measurement cell can be tapped. For contacting the connection point with the electronic component, the circuit carrier has at least one outer-lying conductor track. Furthermore, at least one contact means is provided, via which an output signal of the electronic component can be tapped, the electronic component being connected to the contact means via at least one outer-lying conductor track of the circuit carrier. The contacting between the pressure measurement cell and the circuit carrier, and the circuit carrier and the circuit board or the electronic components is carried out by using corresponding conductive adhesive connections. In order to produce these conductive adhesive connections, the circuit carrier has conductive adhesive bonding bumps and the pressure measurement cell, and the circuit board or the electronic components, have corresponding conductive adhesive bonding surfaces. The circuit carrier preferably consists at least of a plastic injection premolding of galvanizable plastic and a second nongalvanizable plastic, the conductor tracks and the conductive adhesive bonding bumps being produced as a metallic surface coating on the galvanized plastic in a galvanic process. For releasable direct contacting of the connection unit with an attachable controller, the corresponding contact means are preferably formed as contact rivets which can be adhesively bonded by using conductive adhesive into provided openings connected to the conductor tracks. Besides the direct contacting with the attachable controller, additional connecting materials such as conductive adhesives are required in order to produce the other electrical connections in the connection unit.

SUMMARY

The arrangement according to the disclosure for the direct contacting of contact means and the corresponding connection unit for a pressure measurement cell have the advantage over the prior art that an additional contact component made of metal for the direct contacting of an MID circuit carrier can be obviated, since an MID contact surface configured according to the disclosure is used for the direct contacting. Since all the electrically conductive components, for example conductor tracks, solder adhesive bumps and contact means of the MID circuit carrier are galvanized in the same working step, embodiments of the present disclosure advantageously make it possible to minimize the manufacturing outlay for the further processing and to reduce the noble metal costs owing to a smaller gold layer thickness of the coated MID contact surface.

Advantageously, the galvanizable plastic used has a much better flow behavior, or injection molding behavior, and greater possibilities of shaping by the injection molding process than a metal substrate. This provides far more possibilities of generating contact surfaces and signal paths than with a metal substrate. Furthermore, the use of the coated MID contact surface leads to a weight saving and a reduction of the contact interfaces, since the coated MID contact surface is simultaneously a contact site for the direct contacting. The MID contact surfaces may for example be separated from one another by separating ribs which are produced from nongalvanizable plastic during the injection molding. The separating ribs advantageously allow better potential separation and can prevent short circuits between the MID contact surfaces, which may be caused by conductive contamination, for example metal swarf.

The contact hardness of the applied metal layer may be influenced by using the galvanic layer sequence and/or the layer thickness. Advantageously, embodiments of the arrangement according to the disclosure for the direct contacting of contact means can replicate all previously existing contact geometries, for example contact rivets, contact platelets etc.

Embodiments of the present disclosure provide an arrangement for the direct contacting of contact means, which comprises a first contact means arranged on a contact carrier and a second contact means, which acts with a predetermined contact force on the first contact means. The contact carrier consists at least of a plastic injection premolding of galvanizable plastic and a second nongalvanizable plastic. According to the disclosure, the galvanizable plastic of the contact carrier has a predetermined resilient behavior and the first contact means is formed by a metal layer having predetermined dimensions, which can be applied onto the galvanizable plastic of the contact carrier in a galvanic process. In this case, under the effect of the predetermined contact force, the resilient behavior of the galvanizable plastic and the dimensions of the metal layer form a microdepression for guiding the second contact means in the first contact means.

Embodiments of the disclosure advantageously combine the resilient behavior of the plastic carrier with the stiffness of the metal layer. This means that the thickness of the metal layer is predetermined in such a way that a predetermined limit value is not exceeded, beyond which only the metal layer determines the stiffness behavior of the contact element and a microdepression is no longer formed. Besides the resilient property of the plastic carrier, the contact force which acts and the effective area of the metal layer also influence the limit value for the thickness of the metal layer.

By the guiding properties of the microdepression which is formed, embodiments of the arrangement according to the disclosure for the direct contacting of contact means advantageously reduce contact migration and therefore wear of the surface of the metal layer. The arrangement according to the disclosure for the direct contacting of contact means therefore permits almost wear-free electrical and mechanical connection of a measurement cell to an attachable controller over the lifetime, the connection to the attachable controller being separable at any time, for example in order to replace the attachable controller.

Furthermore, embodiments of the present disclosure provide a connection device for a pressure measurement cell, which comprises a circuit carrier having a cylindrical first carrier section and a cylindrical second carrier section that are connected to one another by using a rectangular central section. At least one first conductive adhesive bonding bump, which is contactable with a pressure measurement cell by using a suitable connection technique and connection materials, is arranged on the second carrier section. At least one second conductive adhesive bonding bump, which is contactable with at least one electronic component and/or a circuit board having at least one electronic component by using a suitable connection technique and connection materials, is arranged on the central section. Furthermore, the second carrier section and the central section have at least one outer-lying three-dimensional conductor track for the electrical connection of a first conductive adhesive bonding bump to a second conductive adhesive bonding bump. At least one contact means for the direct contacting is arranged on the first carrier section, the first carrier section and the central section having at least one further outer-lying three-dimensional conductor track for the electrical connection of a second conductive adhesive bonding bump to a contact means. The circuit carrier consists at least of a plastic injection premolding of galvanizable plastic and a second nongalvanizable plastic, the conductor tracks and the conductive adhesive bonding bumps being applied as a metallic surface coating by a galvanic process onto the galvanizable plastic. According to the disclosure, the at least one contact means as a first contact means is contacted with a second contact means by using an aforementioned arrangement according to the disclosure for the direct contacting of contact means.

The circuit carrier may for example be produced by means of a 2C-MID technique, i.e. the injection-molded circuit carrier (molded interconnected device) consists of two components, which comprise a galvanizable plastic over parts of which a second nongalvanizable plastic is injection-molded. The partially protruding surfaces of the injection premolding are coated by a galvanic process with a metallic surface so that the outer-lying conductor tracks, conductive adhesive bonding bumps and MID contact means are formed. The use of such an injection-molded MID circuit carrier is particularly suitable in the present application since, by virtue of the improved configurational freedom and the integration of electrical and mechanical functions, the miniaturization of the connection unit for the pressure measurement cell can be increased.

Optionally, the circuit carrier may also be produced by an MID which is structured directly by using a laser. The MID circuit carrier then consists of an injection-molded part on which the positions of the conductor tracks are structured with the aid of a laser and subsequently coated in a galvanic process with a metallic surface, so that the outer-lying conductor tracks, conductive adhesive bonding bumps and MID contact means are formed.

By the features and refinements described below, advantageous improvements of the arrangement for the direct contacting of contact means and of the connection device for a pressure measurement cell are possible.

In an advantageous configuration of the arrangement according to the disclosure, the layer thickness of the metal layer preferably lies in the range of about 10 to 30 μm. The corresponding contact force lies, for example, in the range of from 1 to 2.5 N.

In a further advantageous configuration of the arrangement according to the disclosure, the metal layer may for example be made of copper and/or nickel and/or gold. Preferably, the metal layer comprises a copper layer and a nickel layer, each of which has a thickness in the range of about 5 to 20 μm, the copper layer being produced first, and as closure a gold layer having a thickness in the range of about 0.05 to 0.2 μm. This is substantially less than in the case of conventional gold-coated contact elements, which generally have a gold layer thickness of more than 0.8 μm In an advantageous configuration of the device according to the disclosure, the metal layer of the first contact means has a predetermined shape with an orientation feature. Thus, the metal layer may for example have a "teardrop" shape or drop shape with a narrow end and a wide end. Besides the improved orientation possibilities, the teardrop or drop shape has the advantage that a required circular contact surface is not restricted by the surface required for through-contacting, since the through-contacting can be arranged in the region of the narrow end of the metal layer. In addition or as an alternative, a plurality of first contact means are arranged with predetermined positioning on the first carrier section, the positioning representing an orientation feature. Thus, two neighboring teardrop shaped metal layers may for example be arranged in such a way that the two narrow ends or the two wide ends respectively face one another, or in such a way that the narrow end faces the wide end.

In a further advantageous configuration of the device according to the disclosure, the first conductive adhesive bonding bumps are contactable with the pressure measurement cell for example by using a solder connection and/or adhesive connection and/or bond connection. Similarly, the second conductive adhesive bonding bumps may be contacted with at least one electronic component and/or a circuit board having at least one electronic component by using a solder connection and/or adhesive connection and/or bond connection.

Exemplary embodiments of the disclosure are represented in the drawings and will be explained in more detail in the description below. In the drawings, references which are the same denote components or elements which perform the same or similar functions.

DETAILED DESCRIPTION

Figure 1:
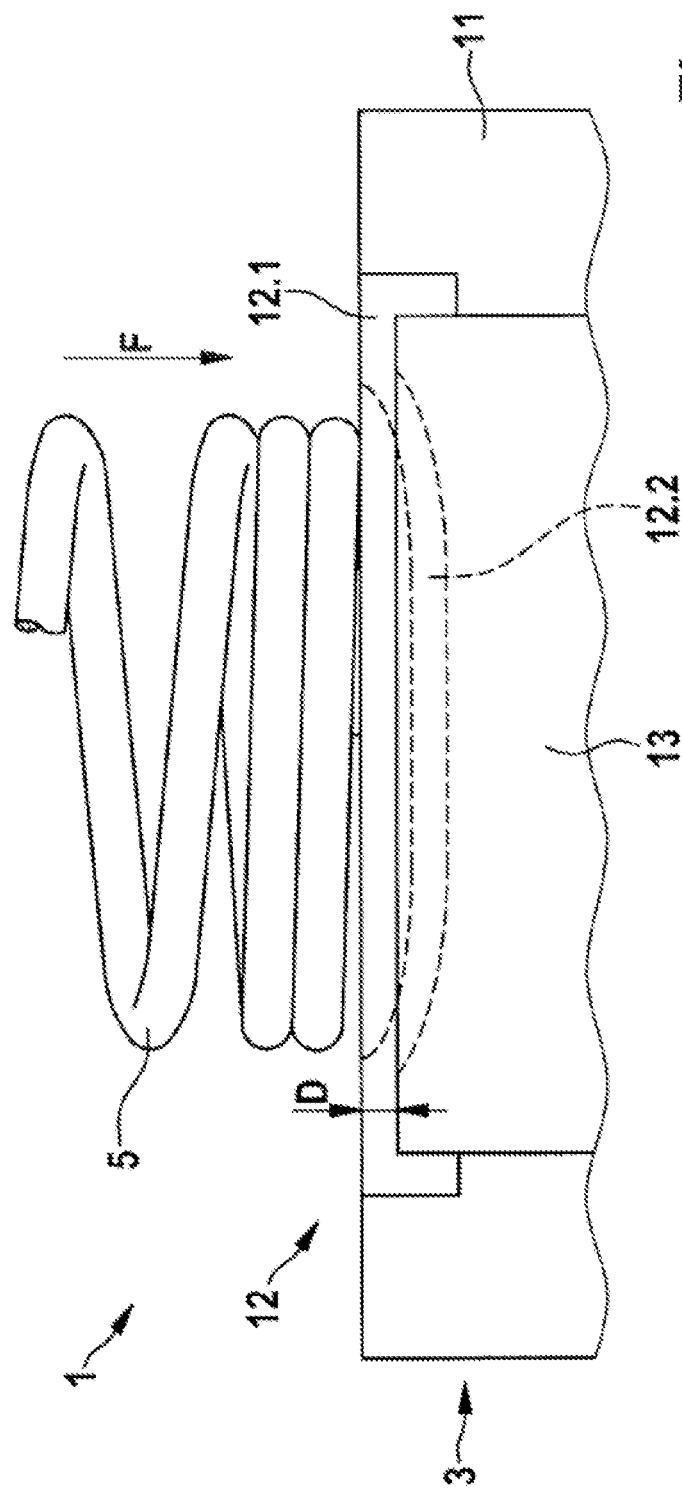
FIG. 1 shows a schematic sectional representation of an arrangement according to the disclosure for the direct contacting of contact means.

As can be seen in FIG. 1, the arrangement 1 according to the disclosure for the direct contacting of contact means comprises a first contact mechanism referred to as a first contact means 12 arranged on a contact carrier 3 and a second contact mechanism referred to as a second contact means 5, which is configured for example as a contact spring and acts with a predetermined contact force F on the first contact means 12. The contact carrier 3 consists at least of a plastic injection premolding of galvanizable plastic 13 and a second nongalvanizable plastic 11.

According to the disclosure, the galvanizable plastic 13 of the contact carrier 3 has a predetermined resilient behavior and the first contact means 12 is formed by a metal layer 12.1 having predetermined dimensions, which can be applied onto the galvanizable plastic 13 of the contact carrier 3 in a galvanic process, the resilient behavior of the galvanizable plastic 13 and the dimensions of the metal layer 12.1 forming, under the effect of the predetermined contact force F, a microdepression 12.2 (represented by dashes) for guiding the second contact means 5 in the first contact means 12. A layer thickness D of the metal layer 12.1 preferably lies in the range of about 10 to 30 µm, and the contact force F lies in the range of from 1 to 2.5 N. In order to illustrate the disclosure, metal layer thickness represented is represented not true to scale but greatly exaggerated.

In the exemplary embodiment represented, the metal layer is formed from a copper base layer, a nickel central layer and a closing gold layer. The copper layer and the nickel layer each have a thickness in the range of about 5 to 20 µm. The gold layer has a thickness in the range of about 0.05 to 0.2 µm.

Figure 2:
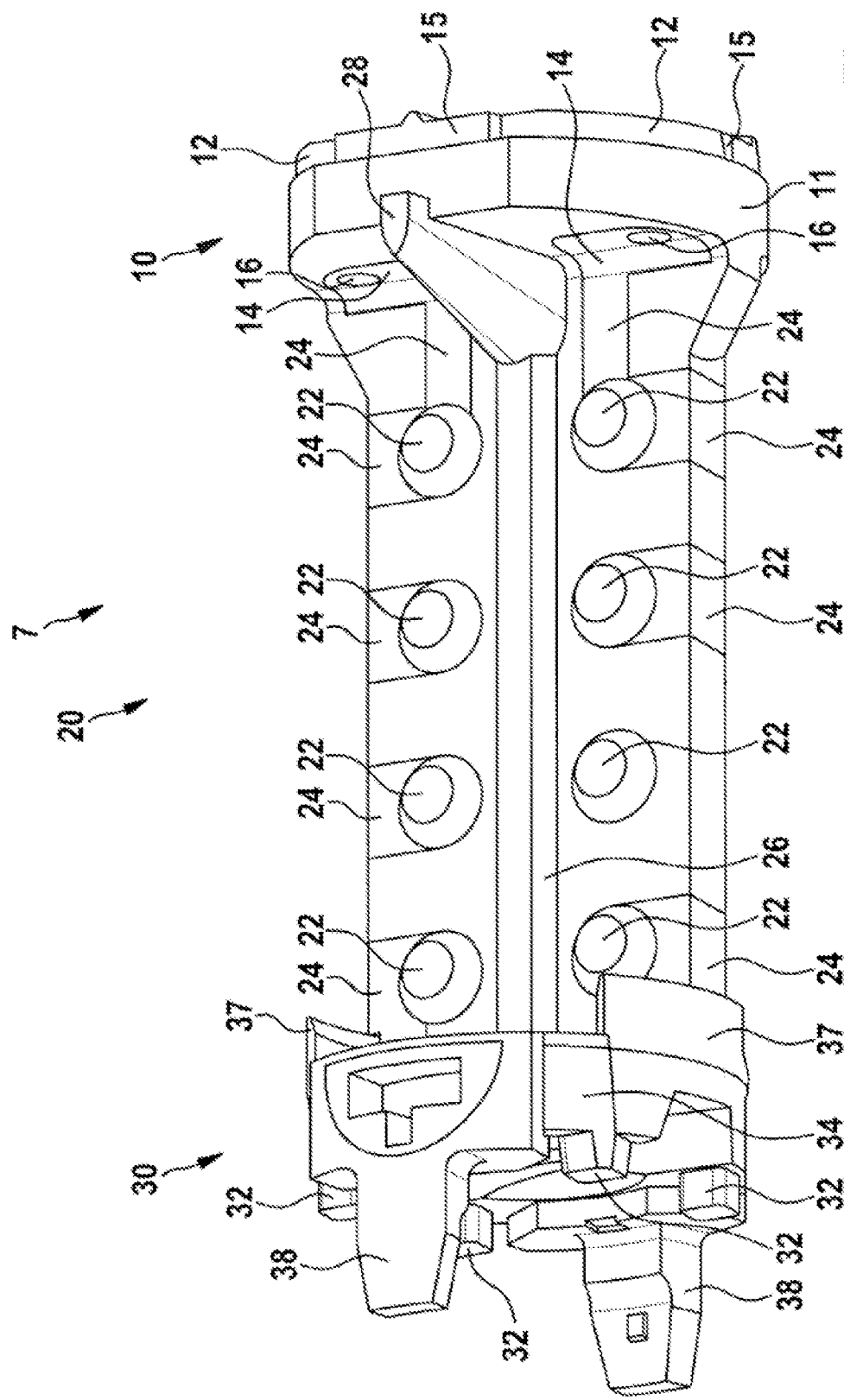
FIG. 2 shows a schematic perspective representation of a circuit carrier for a connection device according to the disclosure for a pressure measurement cell.
Figure 3:
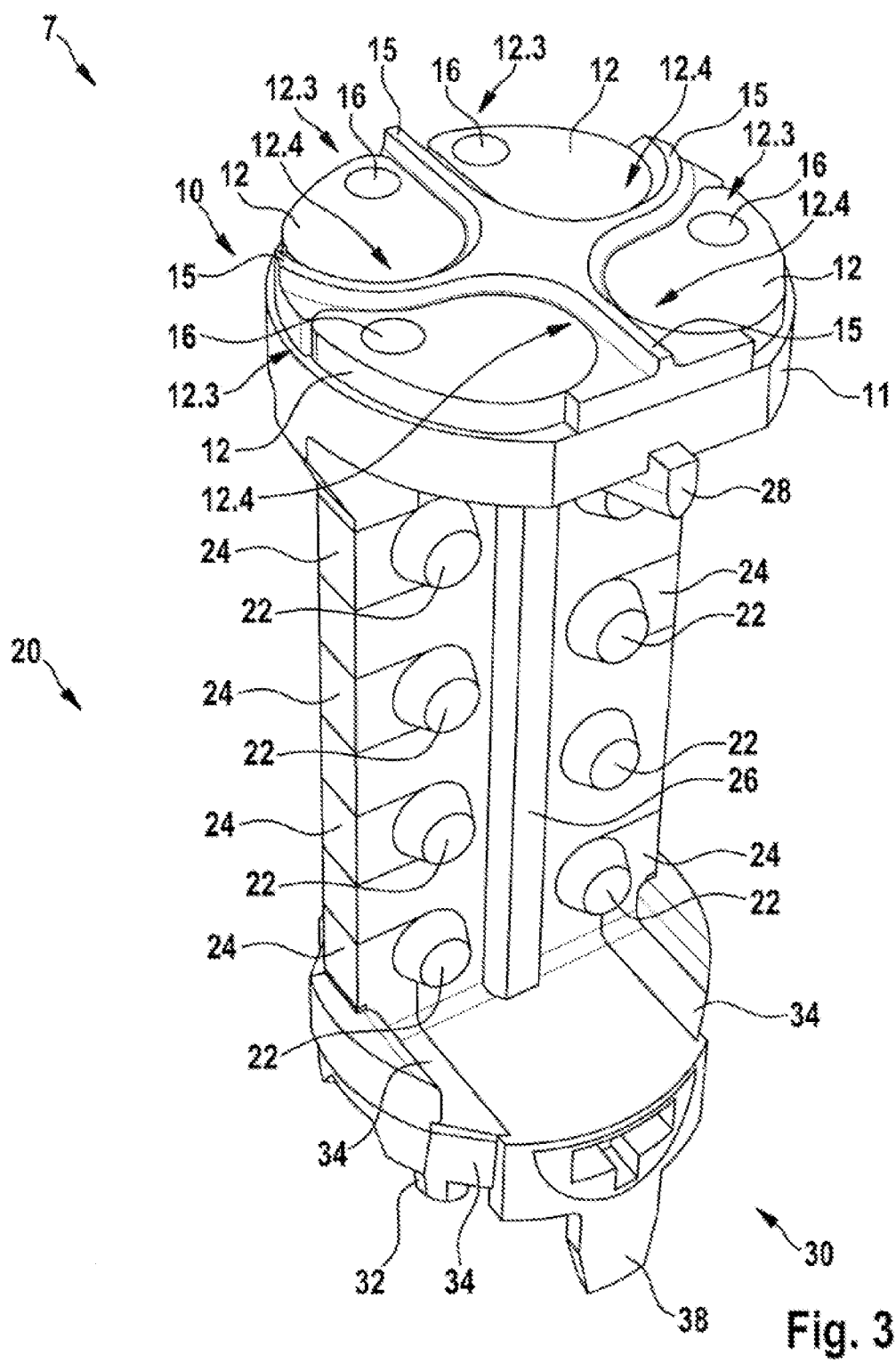
FIG. 3 shows a further schematic perspective representation of the circuit carrier for a connection device according to the disclosure for a pressure measurement cell.

Preferably, the arrangement according to the disclosure for the direct contacting of contact means is used for separable external contacting with an attachable controller in a connection device for a pressure measurement cell having a circuit carrier 7, which is represented in FIG. 2 and FIG. 3.

As can be seen in FIG. 2 and FIG. 3, the exemplary embodiment of the circuit carrier 7 as represented comprises a cylindrical first carrier section 10 and a cylindrical second carrier section 30, which are connected to one another by a rectangular central section 20. The circuit carrier 7 consists at least of a plastic injection premolding of galvanizable plastic 13 (not visible in FIGS. 2 and 3), and a second nongalvanizable plastic 11. Four first conductive adhesive bonding bumps 32 are arranged on the second carrier section, which are contactable with a pressure measurement cell (not shown) by means of a suitable connection technique and connection materials. Eight second conductive adhesive bonding bumps 22 are arranged on the central section, which are contactable with at least one electronic component (not shown) and/or a circuit board (not shown) having at least one electronic component by using a suitable connection technique and connection materials. Furthermore, the second carrier section 30 and the central section 20 respectively have at least one outer-lying three-dimensional conductor track 24, 34 for the electrical connection of a first conductive adhesive bonding bump 32 to a second conductive adhesive bonding bump 22. Four contact means 12 for the direct contacting are arranged on the first carrier section 10, each of which is formed as a metal layer 12.1 having predetermined dimensions and is applied in a galvanic process onto the galvanizable resilient plastic 13 of the contact carrier 3. Furthermore, the first carrier section 10 and the central section 20 have at least one further outer-lying three-dimensional conductor track 24, 34 for the electrical connection of a second conductive adhesive bonding bump 22 to a contact means 12. The conductor tracks 14, 24, 34 and the conductive adhesive bonding bumps 22, 32 are also applied as a metallic surface coating by a galvanic process onto the galvanizable plastic 13, the galvanization of the components 12, 14, 24, 34 of the circuit carrier 7 being carried out in one working step.

The circuit carrier 7 is preferably formed in so-called 2C-MID technology. It is produced as an injection-molded circuit carrier 7 from plastic in MID technology (molded interconnected device), in particular by two-component injection molding. By MID technology, it is possible to produce three-dimensional circuit structures. A second nongalvanizable plastic is injection-molded over parts of a plastic injection premolding of galvanizable plastic. The partially protruding surfaces of the injection premolding are coated by a galvanic process with a metallic surface so that the three-dimensional outer-lying conductor tracks 14, 24, 34, conductive adhesive bonding bumps 22, 32 and first contact means 12 are formed. The circuit carrier 7 is distinguished by high configurational freedom, in particular owing to the integration of electrical and mechanical functions. The connection unit for the pressure measurement cell can therefore be produced constructed particularly compactly.

The structure and functionality of pressure measurement cells are widely known from the prior art, see for example the document WO 2009/007286 A2 cited in the introduction, so that they will not be discussed in detail here.

The circuit carrier 7 is fitted onto the pressure measurement cell (not shown), the shape and dimensions of the essentially cylindrically configured second carrier section 30 being adapted to the shape and dimensions of the pressure measurement cell, and the second carrier section 30 having two ribs 38 for alignment of the rotational position and for mechanical fixing on the pressure measurement cell. For the electrical contacting of the contact points of the pressure measurement cell with conductor tracks 34 of the circuit carrier 7, the four first conductive adhesive bonding bumps 32 are formed, on the upper side of which conductive adhesive can be applied for electrical contacting and mechanical fastening of the pressure measurement cell and the circuit carrier 7. During assembly, the aforementioned ribs 38 allow rotationally accurate positioning of the four first conductive adhesive bonding bumps 32 with corresponding contact surfaces of the pressure measurement cell. Furthermore, the ribs 38 may be adhesively bonded to corresponding adhesive bonding surfaces on the pressure measurement cell. The cylindrical second carrier section 30 of the circuit carrier 7 is terminated by two opposite centering ribs 37, which protrude in the opposite axial directions to the first conductive adhesive bonding bumps 32. Upward, the cylindrical second carrier section 30 of the circuit carrier 20 merges into a rectangular central section 20, for receiving a circuit board (not shown), on one side of which a central rib 26 is arranged in the axial direction in the central section so that a fixing adhesive for fastening the circuit board to the circuit carrier 7 can be applied on its outer-lying side. Furthermore, the eight second conductive adhesive bonding bumps 22 are arranged on the side of the rectangular central section 20 of the circuit carrier 7 which is used to receive the circuit board. These protrude outward somewhat relative to the rectangular base body of the central section 20. They are provided with conductive adhesive for the electrical contacting of the circuit board with the conductor tracks 24.

Upward, the circuit carrier 7 in turn merges into the cylindrical first carrier section 10. As can be seen from FIG. 3, the metal layers 12.1 of the four first contact means 12 have a "teardrop" shape with a narrow end 12.3 and a wide end 12.4. In this case, the narrow and wide ends are used as orientation features in order to install the circuit carrier 7 with the correct rotation. In addition, through-contacts 16 to a corresponding conductor track 14 are respectively introduced into the narrow ends, in order to facilitate orientation and not to restrict the required effective contact area, which is preferably circular depending on the second contact means in the attachable controller. The orientation may be further improved by the represented positioning of the four first contact means 12. Thus, in the exemplary embodiment represented, the lower two neighboring teardrop-shaped first contact means 12 are arranged, for example, in such a way that the two wide ends face one another. The upper two neighboring teardrop-shaped first contact means 12 are arranged, for example, in such a way that the two narrow ends face one another. The four first contact means 12 are separated from one another by separating ribs 15, which are produced from nongalvanizable plastic 11 during the injection molding. The separating ribs 15 advantageously allow better potential separation and can prevent short circuits between the first contact means 12, which may be caused by conductive contamination, for example metal swarf.

On the cylindrical first carrier section 10 of the circuit carrier 7, in extension of the central rib 26, a central centering rib 28 is arranged which cooperates with a corresponding centering aid of the circuit board. The circuit board may be fitted with electronic components, for example an integrated circuit, resistors, capacitors, etc. Furthermore, the circuit board has lateral recesses which cooperate with the outer centering ribs 37 of the circuit carrier 7. On the rear side, the circuit board has eight conductive adhesive bonding surfaces, via which incoming signals of the pressure measurement cell and the outgoing signals, which are forwarded to the first contact means, can be delivered. Via the second conductive adhesive bonding bumps 22 and the conductor tracks 24 in the rectangular central section 20 of the circuit carrier 7, as well as the conductor tracks 34 and first conductive adhesive bonding bumps 32 in the second carrier section 30 of the circuit carrier 7, the conductive adhesive bonding surfaces of the circuit boards are electrically conductively connected to the contact points of the pressure measurement cell by means of corresponding conductive adhesive connections. In the same way, the output signals of the integrated circuit are delivered from the circuit board to the first contact means 12. Thus, the output signals are in turn contacted via the corresponding conductive adhesive bonding surfaces with the second conductive adhesive bonding bumps 22 by using conductive adhesive. The outer-lying conductor track 24 in electrical contact with the respective bump 22 is guided on the central section 20 in the direction of the first contact elements 12 of the first carrier section 10. The first contact means 12, configured as a metal layer 12.1, then form the contact surfaces for a separable electrical connection. The counterpart (not shown) consists, for example, of four second contact elements 5 configured as contact springs or spring pins, which are anchored in the electrical controller and act with a predetermined contact force F on the first contact means 12.

The described connection unit for a pressure measurement cell is suitable particularly for use in brake systems in motor vehicles, but is not restricted thereto. Particularly in the case of premium class brake systems, a multiplicity of pressure sensors are used with only a limited installation space. A pressure sensor requiring minimized installation space is therefore suitable precisely for this application.

What is claimed is:

1. An arrangement for the direct contacting of contact mechanism comprising:
    a contact carrier comprising:
        a plastic injection premolding of galvanizable plastic having a predetermined resilient behavior;
        a nongalvanizable plastic; and
        a first contact mechanism arranged on the galvanizable plastic and formed by a galvanized metal layer having predetermined dimensions; and
    a second contact mechanism configured to act on the metal layer of the first contact mechanism with a predetermined contact force,
    wherein the resilient behavior of the galvanizable plastic and the dimensions of the metal layer are configured such that the second contact mechanism, under the predetermined contact force, forms a microdepression in the first contact mechanism configured to guide the second contact mechanism in the first contact mechanism.

2. The arrangement of claim 1, wherein the metal layer has a layer thickness in a range of between 10 and 30 µm.

3. The arrangement of claim 2, wherein the second contact mechanism is configured such that the predetermined contact force exerted on the first contact mechanism to form the microdepression is in a range of between 1 and 2.5 N.

4. The arrangement of claim 1, wherein the metal layer is made of at least one of copper and nickel and gold.

5. The arrangement of claim 1, wherein the metal layer comprises:
    a copper layer with a thickness in a range of between 5 and 20 µm;
    a nickel layer with a thickness in a range of between 5 and 20 µm; and
    a gold layer with a thickness in a range of between 0.05 and 0.2 µm.

6. A connection device for a pressure measurement cell comprising:
    a circuit carrier comprising:
        a cylindrical first carrier section and a cylindrical second carrier section connected to one another by a rectangular central section;
        at least one first conductive adhesive bonding bump configured to be contacted with a pressure measurement cell by a suitable connection technique and connection materials, the at least one first conductive adhesive bonding bump arranged on the second carrier section;
        at least one second conductive adhesive bonding bump arranged on the central section and configured to be contacted with at least one of:
            at least one electronic component; and
            a circuit board having at least one electronic component by a suitable connection technique and connection materials,
        wherein the second carrier section and the central section each have at least one outer-lying three-dimensional conductor track configured to electrically connect the at least one first conductive adhesive bonding bump to the at least one second conductive adhesive bonding bump;
    a first contact mechanism configured for direct contacting arranged on the first carrier section;
    at least one further outer-lying three-dimensional conductor track located in the first carrier section and the central section and configured to electrically connect the at least one second conductive adhesive bonding bump to the first contact mechanism;
    a plastic injection premolding of galvanizable plastic; and
    a nongalvanizable plastic, wherein:
        the at least one outer-lying three-dimensional conductor track and the at least one further outer-lying three-dimensional conductor track and the at least one first conductive adhesive bonding bump and the at least one second conductive adhesive bonding bump are applied as a metallic surface coating by a galvanic process onto the galvanizable plastic; and
    a second contact mechanism, wherein:
        the first contact mechanism is configured to be contacted with the second contact mechanism by an arrangement for the direct contacting of contact mechanism wherein:
            the plastic injection premolding of galvanizable plastic has a predetermined resilient behavior;
            the first contact mechanism is arranged on the galvanizable plastic and is formed by a galvanized metal layer having predetermined dimensions;

the second contact mechanism is configured to act on the metal layer of the first contact mechanism with a predetermined contact force; and the resilient behavior of the galvanizable plastic and the dimensions of the metal layer are configured such that the second contact mechanism, under the predetermined contact force, forms a microdepression in the first contact mechanism configured to guide the second contact mechanism in the first contact mechanism.

7. The connection device of claim 6, wherein the metal layer of the first contact mechanism has a predetermined shape with an orientation feature.

8. The connection device of claim 7, wherein the predetermined shape is a teardrop shape, and the orientation features include a narrow end and a wide end of the teardrop shape.

9. The connection device of claim 8, wherein the first contact mechanism includes a through-contact extending from the narrow end to the at least one further outer-lying three-dimensional conductor track.

10. The connection device of claim 6, wherein a plurality of first contact mechanisms is arranged with predetermined positioning on the first carrier section, the positioning representing an orientation feature.

11. The connection device of claim 6, wherein the at least one first conductive adhesive bonding bump is configured to be contacted with the pressure measurement cell by at least one of a solder connection, an adhesive connection, and a bond connection.

12. The connection device of claim 6, wherein the at least one second conductive adhesive bonding bump is configured to be contacted with the at least one of the at least one electronic component and the circuit board having the at least one electronic component using at least one of a solder connection, an adhesive connection, and a bond connection.

* * * * *